(12) United States Patent
Hellsten et al.

(10) Patent No.: US 7,884,752 B2
(45) Date of Patent: Feb. 8, 2011

(54) RADAR SYSTEM AND A METHOD RELATING THERETO

(75) Inventors: Hans Hellsten, Linköping (SE); Lars Ulander, Linköping (SE); Patrik Dammert, Gothenburg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 12/517,327

(22) PCT Filed: Dec. 11, 2006

(86) PCT No.: PCT/SE2006/050571

§ 371 (c)(1),
(2), (4) Date: Jun. 2, 2009

(87) PCT Pub. No.: WO2008/073011

PCT Pub. Date: Jun. 19, 2008

(65) Prior Publication Data

US 2010/0033367 A1      Feb. 11, 2010

(51) Int. Cl.
*G01S 13/00* (2006.01)
(52) U.S. Cl. .................................................... 342/25 A
(58) Field of Classification Search ................... 342/25
See application file for complete search history.

(56) References Cited

U.S. PATENT DOCUMENTS

2008/0246647 A1 * 10/2008 Hellsten ...................... 342/22

* cited by examiner

*Primary Examiner*—Thomas H Tarcza
*Assistant Examiner*—Timothy A Brainard

(57) ABSTRACT

A radar system comprising a platform movable along a path in relation to a ground surface portion and carrying a positioning device, a timing device and a radar equipment. It is adapted to implement synthetic aperture radar (SAR) for imaging the ground portion. It includes recording means for collecting radar raw data comprising radar echo amplitudes annotated with distance and the moment of time of collection and being intertwined with platform position measurement data annotated with the respective moment of time of collection thereof.

21 Claims, 5 Drawing Sheets

RADAR SYSTEM AND A METHOD RELATING THERETO

TECHNICAL FIELD

The present invention relates to a diffraction limited SAR scenery, e.g. a (Synthetic Aperture Radar) system for providing an image of a number of objects, for example comprising a ground surface portion. The invention also relates to a method based on diffraction limited SAR.

BACKGROUND

SAR is a signal processing method that can be used to obtain images from an aircraft, or more generally some kind of a platform carrying radar equipment, of the ground with a resolution approaching the resolution of optical systems. Actually a resolution down to the order of half the radar wavelength is possible. Such a resolution is achieved by the radar imaging the ground continuously within some given straight segment of a length L of the platform or aircraft path. The attained angular, also called the azimuth, ground resolution measured along a circular arc at the distance R from the platform will then be:

$$\delta\theta = \frac{2c}{(F_{max} + F_{min})\tan^{-1}(L/2R)}$$

where C is the speed of light and $F_{max}$, $F_{min}$ are the upper and lower limits of the frequency band used by the radar. This formula can be so interpreted that the possible solution is inversely proportional to total aspect angle variation $\Delta\theta = \tan^{-1}(L/2R)$ occurring during the imaging process. In most SAR systems the interval L is small compared to the distance R between the aircraft path and the imaged objects which means that $\Delta\theta$ will be small. Thus only a ground resolution which is much larger than the radar wavelength at the mean frequency $$\bar{\lambda} = \frac{2c}{F_{max} + F_{min}}$$

can be attained. It is desirable to be able to improve the resolution and therefore attempts have been done with much larger aspect angle variation. As this angle approaches its limit of 180°, ground resolution approaches its theoretical limit of $\bar{\lambda}/\pi$. Diffraction limited (DL) SAR imaging means SAR imaging attaining wavelength order ground resolution. However, approaching the diffraction resolution limit involves a number of signal processing problems that need to be solved.

Even if $L/\bar{\lambda}$ is large for DL systems, the physical size of the antenna of the radar system is generally not increased. For so called strip map systems, it must be of the same order of extension as $\bar{\lambda}$. This means that for DL SAR the computational effort becomes large per unit surveyed ground area.

Normally computer efficient processing methods are based on plane wave approximations of radar raw data, whereas a large L/R requires a spherical wave representation of radar raw data. That makes the SAR processing task much more difficult.

Small deviations from a straight aircraft track must be compensated for and this can be done through an accurate navigation with information about the deviations, and compensating the signal processing for such known deviations. Alternatively compensation can be achieved by implementing so called autofocus in which the processing itself involves the task of removing the imaging errors due to a non-linear aircraft path. There are efficient methods for performing compensation for both cases, i.e. an accurate navigation with known deviations or by using autofocus. However it is a drawback that the methods only can be used for plane wave approximations of radar raw data.

DL imaging is implemented in VHF SAR. In the CARABAS™ system which is a Swedish system, $F_{max} \approx 85$ MHz and $F_{min} \approx 25$ MHz whereas $\Delta\theta \approx 60°$. The ground resolution will then be of the order of magnitude 2 meters. Less extreme but also close to the diffraction limit is an X-band SAR system attaining a ground resolution of 0.1 m.

DL SAR processing methods exist which can be used when the SAR path, i.e. a path of the platform or the aircraft, is accurately known. In order to make the systems of practical use without putting to high requirements on navigation and making the systems too expensive, these methods ought to be generalized so that they can be applied also when knowledge of the platform path is lacking or is less precise.

The principle of non-DL motion error compensation is explained in FIG. 1. Non-DL SAR imaging used in microwave SAR is based on the assumption that radar waves are approximately plane across the imaged area. Then motion errors affect the SAR raw data by range translations. SAR focusing can thus be achieved just by range adjustments in the raw data as can be seen in FIG. 1 wherein A, B indicate an ideal straight SAR path, whereas the curved line CD indicates the actually flow path, assuming radar wavefronts across the image to be approximately plane, actual data collected at P and at certain range (i.e. along the intersection between ground and the radar wavefront W1) will thereby be approximately identical to ideal data collected at Q along a straight path at another range (i.e. along the intersection between the ground and the radar wavefront W2). Thus by introducing appropriate range shifts in the data, these data can be attributed to the correct ground points, whilst the straight path assumption kept.

Considering DL SAR processing, the most obvious way for performing DL SAR processing is based on use of a range migration algorithm, RMA, which can be implemented to be computationally fast by means of FFTs (Fast Fourier Transform). It is similar to Fourier based approximate methods of non-DL SAR processing.

RMA recognizes that the radar waves will be spherical across the imaged area. RMA however crucially depends on that, for a platform moving along a straight line, such spherical waves can be transformed into a plane wave expansion, and the SAR processing cast in a form similar to non-DL imaging.

If the spherical nature of the radar waves is to be taken into account, track deviations cannot be represented as range shifts, which is illustrated in FIG. 2, wherein the same reference figures are used as in FIG. 1. DL imaging adopting RMA assumes spherical radar wavefronts, intersecting the (roughly) plane ground in circles. Again a SAR platform has attempted to follow an ideal straight path AB, whereas CD is the actual path flown. The situation is thus that data collected at P and at a certain range (i.e. along the intersection between ground and the radar wavefront W1) no longer will be identical to ideal data collected at any point Q along a straight for any other range. It is no longer trivial to transform data collected along the actual path to fit a straight path assumption. The possibility to compensate data by equal data that would have been captured along a straight track is hence lost and the RMA method will not be applicable. Instead of RMA, for performing DL SAR processing, so called global backprojection, GBP, may be used. This is a technique that also is used in computer tomography. It is however a drawback of GBP that it is not computationally efficient. Therefore the areas to be imaged have to be quite small. An advantage of GBP is however that it does not involve any assumption concerning the straightness of the platform path. Thus, if the platform moves in a known but non-straight manner, GBP can be used for SAR processing.

However, when the platform path deviates from a straight line, also the ground topography becomes of importance for focusing. This means that in such cases also the ground topography has to be known albeit the accuracy does not have to be very high if the deviations from a straight path are small.

Motion compensation by range shifts in non-DL SAR imaging does not require full knowledge of the SAR path. However, DL SAR focusing requires full knowledge of the SAR path. Since $L/\bar{\lambda}$ is large the SAR path will involve many degrees of freedom all of which must be made known with wavelength dependent accuracy, which is very complicated and puts very high requirements on equipment, processing means etc.

For non-DL SAR, and since $L/\bar{\lambda}$ is small, dominant ground reflectors will be apparent already in raw data and can be used to estimate the range shifts caused by the deviations from a straight track platform path. For strip-map DL imaging, the physical antenna of the radar system must be small in relation to $\bar{\lambda}$, i.e. in wavelength units even smaller than for non-DL SAR imaging. Such a small antenna does not provide any initial resolution which means that for all except for very unusual types of ground, for example large industrial plants, there will be no dominant ground reflectors apparent in the raw data which is an extra complication in DL imaging. Due to the above discussed characteristics of DL imaging, it is apparent that DL autofocus is a most complicated issue.

In order to be able to better handle motion errors, a number of so called local backprojection methods, LBP, have been developed. These have the same capability to take into account known motion errors in DL SAR as GBP. However, they are numerically much more efficient and by using LBP, it gets possible to obtain real or near real time processing of for example CARABAS data with significant aerial coverage.

One such method is the so called Factorized Fast Backprojection, FFB, as also described in "Synthetic-Aperture Radar Processing using Fast Factorised Back-Projection, IEEE Trans. Aerospace and Electronic Systems, Vol. 39, No. 3, pp. 760-776, 2003 by Ulander, L., Hellsten, H. and Stenstrom, G. A base n FFB SAR-processing algorithm produces a SAR image based on a raw data set consisting of radar range returns from $n^k$ position, where n, and k are integers, distributed over a platform path segment of length L. Typically n=2 or n=3 whereas k≈10. However, for error growth reducing purposes, also n≈10 with k≈8 can be considered. The FFB SAR image reconstruction occurs in k iterations whereby each iteration performs a subaperture coalescing, forming one new subaperture for every n neighboring subaperture defined in the previous iteration. To every subaperture at every level of iteration there is associated a SAR image of the same ground portion. Coalescing subapertures can, based on geometrical data for them and their orientation with respect to the ground, be associated with a linear combination of the associated ground images upon which the new subaperture becomes associated with a single new SAR image with angular resolution improved by the factor n.

The subapertures of the first iteration are defined to have lengths equal to the separation between the $n^k$ data positions. This separation is generally some fraction of the real aperture of the radar system. The associated SAR images of the first iteration are simply the $n^k$ range returns, each only possessing the angular resolution of the real aperture of the radar system.

The advantage of FFB is that, since angular resolution increases exponentially with each iteration, the image representations at initial iterations allow a coarse level of discretization saving computational effort. Only the last iteration requires a full discretization of the final SAR image. In fact, for a N×N point SAR image, where there are N=$n^k$ data positions along the SAR path, the FFB computational effort is of the order $N^2 \times^n \log N$. This means that the computational effort is comparable to that of RMA as well as of Fourier based methods of non-DL SAR, which require a processing effort of the order $N^2 \times^2 \log N$.

SUMMARY

What is needed is therefore a radar system through which an image can be obtained of a ground portion or similar. Particularly a radar system is needed which is small, cheap and compact. A radar system is also needed which is uncomplicated and which easily can be plugged in with a platform, an aircraft etc.

Particularly a radar system is needed which supports a processing which is efficient and fault tolerant and through which imaging errors due to a non-linear platform path can be eliminated. Even more particularly a radar system is needed which can be used with uncomplicated navigation equipment or even without having to rely on any particular navigation equipment.

Particularly a radar system and a method respectively is needed for efficiently providing an image with optimal resolution with respect to the given wavelength of a ground surface portion from a movable platform comprising a radar equipment and through which one or more of the above mentioned objects can be fullfilled. In short a system and a method respectively is needed which enables DL SAR autofocus.

Therefore the invention provides a radar system having the features of claim 1. It particularly suggests a radar system comprising a platform movable along a platform path in relation to a number of objects, for example a ground surface portion, wherein said platform is adapted to support or carry a radar equipment comprising at least one antenna and being adapted to implement a diffraction limited synthetic aperture radar technique for reproducing the objects. It further comprises recording means for collecting and recording distance data collected during movement of said platform along the platform path or known distance data as well as radar raw data and SAR processing means for processing the collected (or known) data and radar raw data. Advantageously or preferred embodiments are given by the appended subclaims.

The processing means are particularly, according to the invention, adapted to provide a spherical wave representation of radar raw data and are further adapted to form a sequence of SAR images (radar amplitudes) along a non-linear platform path with respect to linear subapertures in the form of space vectors between aircraft path points in space. The processing means further are adapted to provide for merging of adjacent subapertures as a vector addition between the corresponding vectors in which the SAR images associated to the adjacent subapertures for a common ground area portion are used to construct a new SAR image over the same area with improved resolution and which is associated to the subaperture being the sum of the vectors corresponding to the coalesced subapertures. The processing means further comprise means for performing an autofocus operation, where said autofocus processing means are adapted to compare the SAR images related to subaperture vectors to be added in order to find the relative orientation between these subaperture vectors and thus to define the parameters for construction of the SAR image of the vector sum of the subapertures.

The autofocus processing means are particularly adapted to merge SAR images pairwise. Alternatively the autofocus processing means are adapted to merge SAR radar images in triples or in groups of four or more.

Particularly topography information providing means are provided to collect or estimate information about the topography of the ground portion to be imaged or represented. The required accuracy on ground topography information depends on the degree of non-linearity of the aircraft path. In practice, in many applications an assumption that the topography is perfectly flat will be sufficiently accurate. In one embodiment ground topography information is given by a function describing azimuth angle dependence of the ground topography on the distance for the respective displacement vector to the ground at the respective point in time in the polar coordinates and the polar angle with respect to the direction of the respective displacement vector.

Particularly, when topography information is irrelevant, the construction of a new SAR image with the subaperture being the sum of vectors being the subapertures of the contributing SAR-images will depend only on the relative orientation between these vectors and not their absolute position over ground. For instance, if SAR images are constructed by pairwise addition of subaperture vectors and these vectors are nearly parallel, it is only the length of the vectors and the angle between them, which are of importance. If e.g. the angle between the vectors happens to be large (e.g. by some sudden platform maneuver along the SAR path) some dependence on the ground topography in the form of some dependence on angle of the plane of the two coalescing subapertures and the ground plane will exist. Particularly the autofocus processing means are adapted to pairwise compare SAR radar images by iteratively varying at a time at least one of the parameters affecting the construction of the coalesced SAR image and thus finding the parameter selection describing the relative orientation between the merging subapertures which provides the best matching between the two SAR images to be linearly combined into one new.

In particular, in one embodiment the matching of the SAR images to be coalesced is measured by a correlation value obtained by multiplication and integration of the image intensities (amplitudes squared) over a common region to be coalesced. Correlation between SAR image amplitudes themselves is more seldom useful because of speckle abundance in most types of SAR scenes.

In an alternative embodiment the autofocus processing means are adapted to obtain a correlation maximum by dividing SAR images into subimages and correlating subimages within an image to calculate at least one parameter comprising the angle $\beta(Y_{i/2})$ between two adjacent points $X_i, X_{i+1}$ in the polar coordinates.

The number of resolution cells for a SAR image associated to a subaperture of a certain length will be small when the length of the subaperture is small viz. in the early stages of the coalescing chain. Also, since in the early stages, each resolution cell contribution is an average over very many ground scatterers, SAR image contrasts are expected to be low. The optimum of a matching between the SAR images to be coalesced under variation of the coalescing parameters will thus not be very sharp. When coalescing has continued to the level of large subapertures, accuracy will be high and matching sharp. It turns out that the required angular accuracy in the FFB chain is inversely proportional to the length of the aperture so it thus matches the accuracy arrived at in the described autofocus method. In other words it will not be necessary to "go back" in coalescing chain and re-adjust the relative orientation of shorter subaperture vectors in the iteration stages already passed, since such fine adjustments will have no implication on the coarse level resolution for which these previous iteration stages is of importance.

A radar system can use different kinds of waves. In some embodiments it is adapted to use microwaves for the radar measurements. In alternative embodiments, which are advantageous, it is adapted to use radio waves with for example a wavelength of about 3-15 m.

So far it had not been possible to in a simple and cost-effective way provide images with a good resolution using radio waves since the merging of subapertures had to be done using coordinates fixed in relation to ground. According to the present invention this is enabled since there is done a tranformation of coordinates into a coordinate system which is not fixed in relation to ground but instead it is fixed in relation to the platform which means that autofocus can be implemented. A corresponding method is therefore also provided having the featuers of claim 13.

BRIEF DESCRIPTION OF THE DRAWINGS

The invention will in the following be further described, in a non-limiting manner, and with reference to the accompanying drawings, in which.

DETAILED DESCRIPTION

The present invention provides a radar system and a method respectively in which DL SAR processing means are implemented using an FFB algorithm in such a manner that processing does not have to assume any special significant ground features to be apparent in raw data even if that would facilitate determining the platform path and hence facilitate motion compensation. This is very advantageous. Further a platform path depends on a large number of parameters which implies a large set of motion determining parameters which would require a considerable computation expediency and require a complicated equipment in the system which is fast enough.

Figure 1:
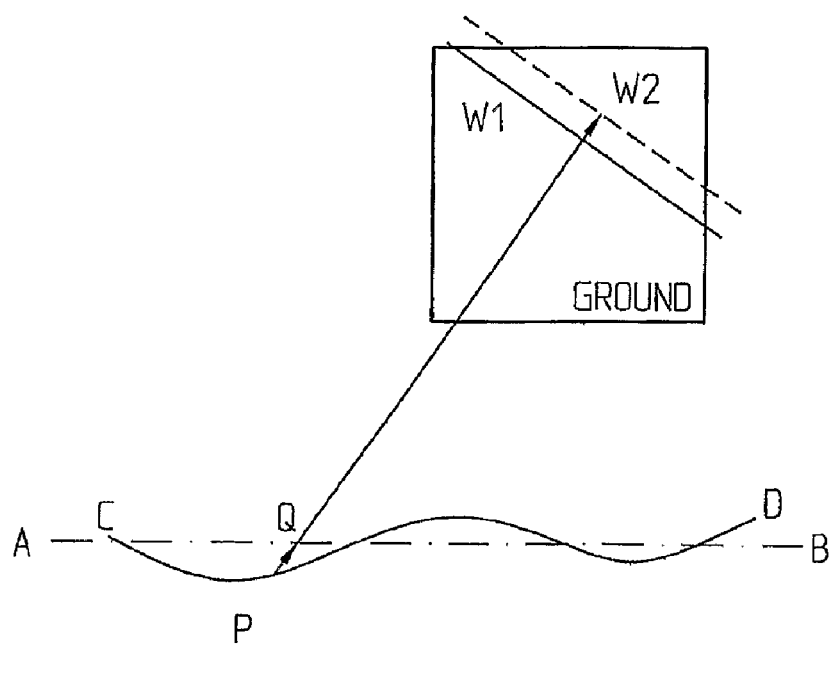
FIG. 1 very schematically illustrates the ideal and the real, actual path respectively of a SAR platform assuming plane wavefront, FIG. 2 very schematically illustrates the ideal and the real, actual path respectively of a SAR platform assuming a spherical wavefront, FIG. 3 schematically illustrates merging of two subapertures into a new subaperture.
Figure 2:
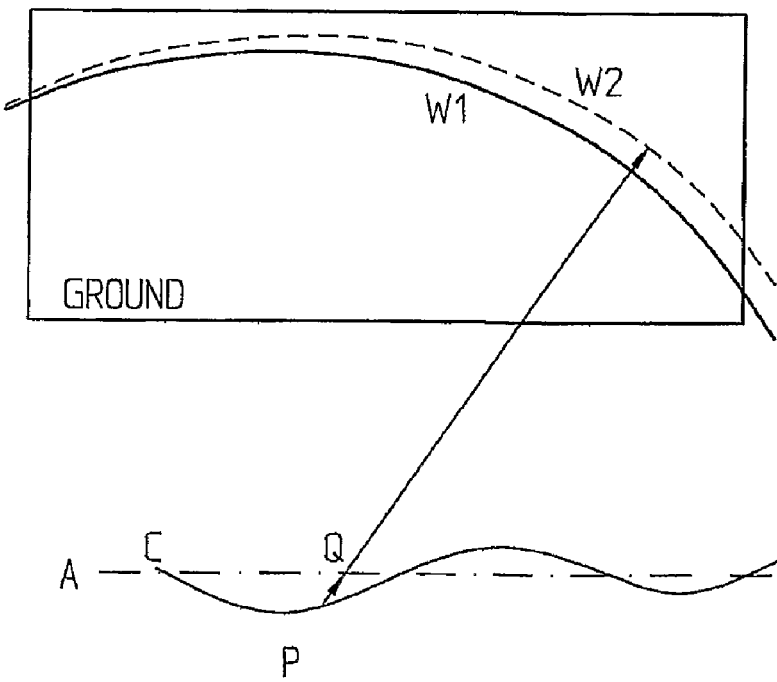

First, the inventive concept is described in a somewhat more general manner and it can be said to consist of three main parts. First, it is assumed that $P_i$ is a set of points in space and $P_i \rightarrow P_{i+1}$ is a set of neighboring subapertures which have a common length L and which image the same ground area $\Omega$. The image amplitudes, here denoted $f_{P_i \rightarrow P_{i+1}}(Q)$, for the resolution cells $A_L$ centered at points Q belonging to the imaged ground area $\Omega$ are considered. The resolution cell size obtained from an aperture A→B (cf. FIGS. 1, 2) will produce a radar backscattering amplitude which is approximately constant over A→B, but which varies over larger distances, due to interference between the reflecting components of the resolution cell. In fact, the image amplitudes can be represented as products $$f_{P_i \to P_{i+1}}(P) = \phi_{P_i \to P_{i+1}}(Q) f(Q)$$

where the component $\phi_{P_i \to P_{i+1}}(Q)$ fluctuates randomly (with a zero mean and unity variance), with each subaperture $P_i \to P_{i+1}$ and the systematic component where $f(Q)$ provides the amplitude bounds for the oscillatory nature of $f_{P_i \to P_{i+1}}(Q)$. The value of $f(Q)$ is a property of the ground in the resolution cell.

Considering the mean value of any stochastic function $x(Q)$ defined on the set of resolution cells $\Omega/A_L$ of $\Omega$, and assuming that there are $N_L$ such cells, it is possible to compute, as an approximation, the mean value which will be:

$$\langle x(Q) \rangle = \frac{1}{N_L} \sum_{Q \in \Omega/A_L} x(Q) + O\left(\frac{1}{N_L}\right)$$

Considering two independent SAR images $f_{P_i \to P_{i+1}}(Q)$ and $g_{P_i \to P_{i+1}}(Q)$ of $\Omega$ and comparing the mean value expressions, $$\langle f_{P_{i-1} \to P_i}(Q)^2 f_{P_i \to P_{i+1}}(Q)^2 \rangle \qquad 1$$

$$\langle f_{P_{i-1} \to P_i}(Q)^2 g_{P_i \to P_{i+1}}(Q)^2 \rangle \qquad 2$$

for 1 is obtained:

$$\langle f_{P_{i-1} \to P_i}(Q)^2 f_{P_i \to P_{i+1}}(Q)^2 \rangle = \langle \phi_{P_{i-1} \to P_i}(Q)^2 \rangle \langle \phi_{P_i \to P_{i+1}}(Q)^2 \rangle$$
$$\langle f(Q)^4 \rangle =$$
$$= \langle f(Q)^4 \rangle$$

and for 2 is obtained:

$$\langle f_{P_{i-1} \to P_i}(Q)^2 g_{P_i \to P_{i+1}}(Q)^2 \rangle = \langle \phi_{P_{i-1} \to P_i}(Q)^2 \rangle \langle \gamma_{P_i \to P_{i+1}}(Q)^2 \rangle$$
$$\langle g(Q)^2 \rangle \langle f(Q)^2 \rangle =$$
$$= \langle g(Q)^2 \rangle \langle f(Q)^2 \rangle$$

If may be assumed that: $\langle f(Q)^2 \rangle = \langle g(Q)^2 \rangle$, whereupon $$\langle f_{P_{i-1} \to P_i}(Q)^2 f_{P_i \to P_{i+1}}(Q)^2 \rangle - \langle f_{P_{i-1} \to P_i}(Q)^2 g_{P_i \to P_{i+1}}(Q)^2 \rangle == \qquad (3)$$
$$\langle f(Q)^4 \rangle - \langle f(Q)^2 \rangle^2 = \langle [f(Q)^2 - \langle f(Q)^2 \rangle]^2 \rangle = \text{variance}[f(Q)^2] > 0$$

That two SAR images $f_{P_i \to P_{i+1}}(Q)$ and $g_{P_i \to P_{i+1}}(Q)$ from two apertures are independent occurs when there is a disagreement concering the location of the two subapertures with respect to the ground. Due to this disagreement one or both of the subapertures will attribute to an erroneous reflectivity $f(Q)$ or $g(Q)$ to any particular ground point P. At least one of the values stems from another ground point Q', the vector Q→Q' corresponding to the location error.

The last formula (3) provides according to the present invention the crucial tool for focusing the SAR image, which is necessary if the platform path is unknown. It is particularly used in combination with the FFB method to be described below. Actually it states that, comparing subaperture images, the subaperture can be aligned by an optimization procedure in which for pairs of neighboring subapertures the expression $$\sum_{P \in \Omega/A_L} f_{Q_{i-1} \to Q_i}(P)^2 g_{Q_i \to Q_{i+1}}(P)^2 \qquad (4)$$

is evaluated. When the two subapertures are aligned so that the corresponding reflectivities are attributed to one ground point, the expression will be maximum, given that $N_L$ and the absolute value of the variance $\lfloor f(P)^2 \rfloor$ are sufficiently large, which hence relates to the particular case when the path is unknown and describes the autofocus procedure which is one feature of the present invention which is made possible through the basic or fundamental implementation of the invention, i.e. the specific way of implementing FFB processing.

In order to be efficient, the optimization criterion laid down can be used with the FFB processing method according to the invention. The given criterion requires that two SAR images be obtained corresponding to two neighboring subapertures. The criterion allows these subapertures to be correctly located to each other and if the base 2 (n=2) for the FFB algorithm is chosen, it will reconstruct the SAR image entirely by merging subaperture SAR images pairwise. The base 2 FFB algorithm will hence allow subaperture positions to be adjusted by the criterion laid down above (3) assuming $\langle f(Q)^2 \rangle = \langle g(Q)^2 \rangle$, whenever knowledge of their position is requested in the reconstruction scheme, i.e. when the path of the platform is unknown.

Returning to the basic part of the invention, and concerning the second basic part of the invention, here supposing that the platform path is known, FFB processing can rely on a fixed relation between the SAR image and ground positions. For autofocus, however, in the continuing FFB processing, it is not possible to assume any intermediate subaperture image to have some specific position with respect to ground points, since any such subaperture and its associated SAR image will be shifted with respect to the ground in the continuing subaperture merging stages.

If the path is not known, there is a complication in that the SAR image is dependent on the ground topography. Therefore there has to be some association between the subaperture and ground positions. For a nearly straight path, i.e. when the intention has been to fly on a straight course, the dependence is weak and the association thus only approximate. This means that for any pair of subaperture SAR images, the corresponding ground positions are not required to be known exactly. They can be matched by the optimization criterion (3), but even after the matching no exact presumption on ground location should or has to be made, which is advantageous.

Figure 3:
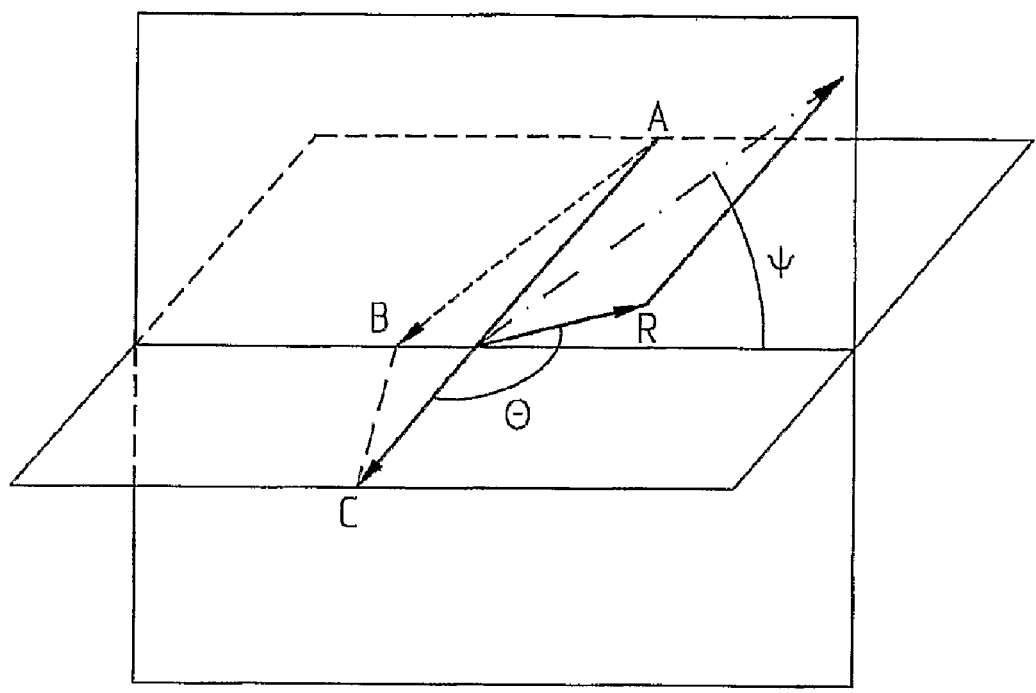

FIG. 3 shows the intrinsic SAR image coordinates of the subaperture pair A→B and B→C. The new subaperture obtained by merging then is A→C and the SAR image coordinates are the coordinates defined by a merged origin at the midpoint of A→C, A→C being the polar axis measuring the polar angle $\Theta$ of the vector R pointing at an arbitrary ground point, and polar azimuth angle $\Psi$ measured with respect to the plane of triangle A→B→C.

With reference to FIG. 3, $f_{A \to C}(R,\Theta)$ is the merged SAR image and $f^{(0)}_{A \to B}(R,\Theta)$, $f^{(0)}_{B \to C}(R,\Theta)$ are the SAR images with respect to A→B and B→C respectively. All three SAR images are represented in polar coordinates with the polar angle $\Theta$ measured with respect to the direction of A→C and the distance R with respect to the midpoint of A→C. Moreover $f_{A \to B}(R,\Theta)$ and $f_{B \to C}(R,\Theta)$) represent SAR images with polar angles $\Theta$ measured with respect to the directions of A→B and B→C respectively and distances R with respect to the midpoints of A→B and B→C respectively.

The ground topography is of importance for SAR focusing unless A→B and B→C are parallell or if the path is known. In the first case the ground topography implies a functional relationship $\Psi=\Psi(R,\Theta)$, whereas the azimuth angle $\Psi$ is measured with respect to the plane containing the (non-degenerate) triangle A→B→C. Either if A→B and B→C are parallell, or, if not, by an assumption $\Psi=\Psi(R,\Theta)$, there are explicit coordinate transforms between the polar coordinates of A→B and B→C and those of A→C. By these transforms it is possible to compute $$f^{(0)}_{A \to B}(R,\Theta) = f_{A \to B}\{R_{A \to B}[R,\Theta,\Psi(R,\Theta)],\Theta_{A \to B}[R,\Theta,\Psi(R,\Theta)]\}$$

$$f^{(0)}_{B \to C}(R,\Theta) = f_{B \to C}\{R_{B \to C}[R,\Theta,\Psi(R,\Theta)],\Theta_{B \to C}[R,\Theta,\Psi(R,\Theta)]\}$$

according to which the merged subaperture SAR image can be computed according to:

$$f_{A \to C}(R,\Theta) = f^{(0)}_{A \to B}(R,\Theta) + f^{(0)}_{B \to C}(R,\Theta)$$

To summarize, given the shape of the triangle A→B→C, for example by the lengths of |AB| and |BC| respectively and the angle at B, and to some approximate degree (assuming A→B→C near degenerate viz. B small), its orientation with respect to the ground, the merged SAR image can be computed. No precise assumption on the location of A, B, C relative to ground is required. To find the shape of A→B→C, the following expression is formed:

$$\sum_{(R,\Theta) \in \Omega/A_L} f^{(0)}_{A \to B}(R,\Theta)^2 f^{(0)}_{B \to C}(R,\Theta)^2 \quad (5)$$

The optimum of (5) with respect to variations of the shape of A→B→C provides the correct orientation of the two subapertures for their merging.

The optimization of the mutual orientation of subaperture pairs and their subsequent merging into a new subaperture, which is carried out for all subaperture lengths from raw data level to the complete image, forms the complete autofocus chain.

According to the third aspect of the invention, the number of resolution cells $N_L$ for an image associated to a subaperture of length L will be small when L is small, i.e. in the early stages of the autofocus chain. Also, since in the early stages, each resolution cell contribution is an average over very many ground scatterers, the absolute value of the variance $[f_{A \to B}(R,\Theta)^2]$ is expected to be low. The optimum of the sum referred to above will not be sharp when L is small, but it turns out that the required angular accuracy in the FFB chain is inversely proportional to the length L. The situation is thus that when L is small, there are no statistics available to make precise assumptions concerning the shape of triangles A→B→C. On the other hand, no precise assumptions are required since the resolution of the SAR images $f_{A \to B}(R,\Theta)$ is low. When L becomes large, later in the autofocus chain, the higher resolution of the SAR images allows an improved accuracy in the merging process which also will be required for the merged SAR images to remain fully focused. It is not necessary to "go back" in the iteration chain and re-adjust the shapes of the triangles A→B→C of the passed iteration stages since such fine adjustments will have no implication on the coarse level resolution for which these previous iteration stages are of importance. This property of the autofocusing scheme indicates that it will be numerically expedient.

Figure 4:
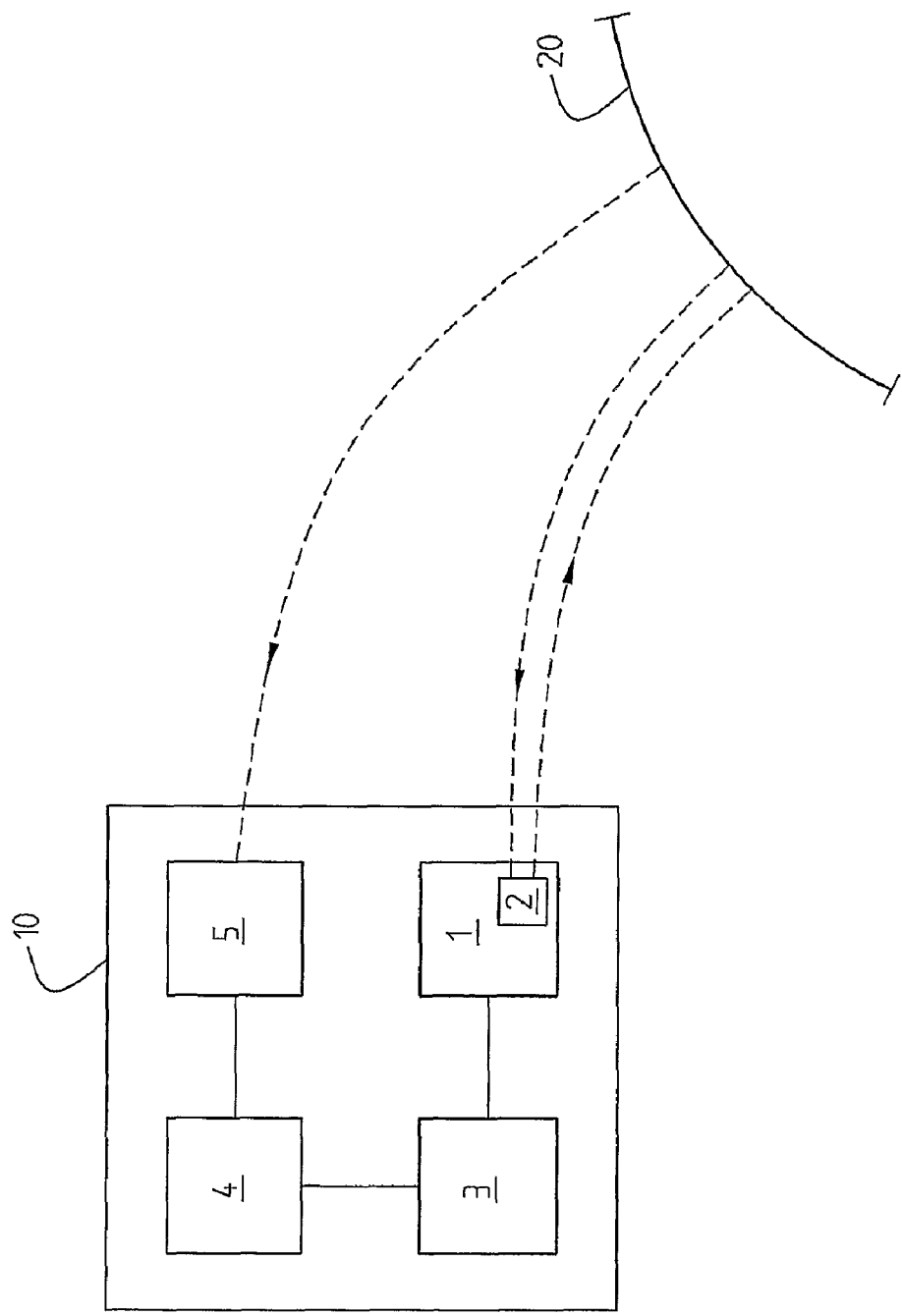
FIG. 4 is a very schematical block diagram of a radar system according to the invention.

FIG. 4 very schematically illustrates a block diagram of a platform 10 with a radar equipment 1 comprising an antenna 2. The radar equipment further comprises processing means 3 which may include or communicate with autofocus processing means 4. Schematically illustrated is also an arbitrary kind of a navigation system 5, e.g. GPS (Global Positioning System), which is used to make an image of the ground portion 20.

In a general aspect the invention relates to the provisioning of a specific formulation of FFB processing only referring to the intrinsic coordinates of the merging subaperture pairs which is applicable both if the SAR path or the platform path is known and if it is unknown. Through this basic solution, it gets possible to provide a solution to the problem when the platform path is unknown. This is explained with reference to the flow diagrams 5 and 6.

Figure 5:
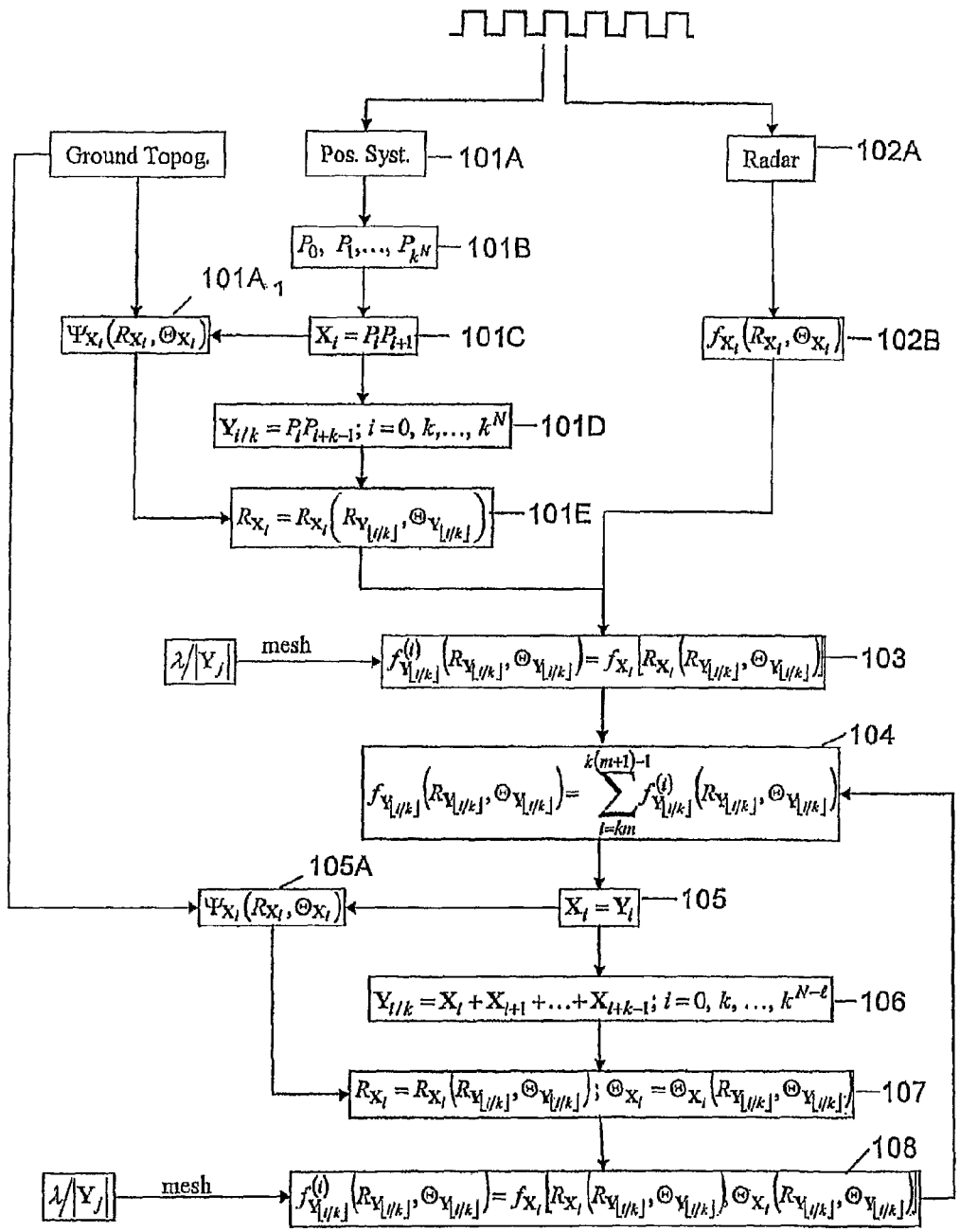
FIG. 5 is a detailed flow diagram describing, in mathematical terms, the procedure of iteratively merging subaperture pairs.

Hence, with reference to FIG. 5, the square pulse train on top, time, illustrates clock stimuli providing time assignments to data and geo-position measurements. The geo-position measurements intertwine between radar data, or vice versa, so that each radar data can be assumed to be located at the midpoint between two known platform positions as provided by a positioning or navigation system, 101A. $P_0, P_1, \ldots, P_{k^N}$ is supposed to be a set of points in space, 102, and $X_i = P_i \to P_{i+1}$ is supposed to be vectors comprising neighboring subapertures of a common length L imaging the same ground area, i.e. vectors between respective points $P_i$. Thus, considering each iteration stage l, l=0, 1, . . . , N in an N+1 stage iterative process of SAR image reconstruction, it is supposed that a set of $k^{N-l}$ (k=2, 3, . . . ) SAR images $f_{X_i}$ originating from linear apertures forming a connected chain of vectors $X_i = P_i P_{i+1}$; i=0, 1, . . . , $k^{N-l}$ between points $P_i$ in the 3-dimensional space is given. Localization accuracy of the points $P_i$; $P_{i+1}$; $P_{i+2}$; . . . etc. is given by some distance error bound. Furthermore, within some given bound the vectors $X_i$ are assumed to be of equal length and meander along a straight line. The intertwined SAR radar images $f_{X_i}$, 102B, are assumed to cover the same ground region $\Omega$.

The SAR images are assumed to be derived by the same algorithm expressing each SAR image as a function $f_{X_i}(R_{X_i}, \Theta_{X_i})$, wherein $R_{X_i} = |R|$ where R is radius vector between any ground point in $\Omega$ and the midpoint $Q_i = P_i + X_i/2$ of $X_i$; $\Theta_{X_i}$ is the polar angle $\cos^{-1}(X_i \cdot R/|X_i||R|)$ with respect to the direction of $X_i$. Angular resolution is $\lambda/|X_i|$. Coordinate mesh angular fineness is assumed to be some fixed fraction of this value: 103, 104, 105.

As discussed above, knowledge of the ground topography is assumed and implies that to each SAR image $f_{X_i}(R_{X_i}, \Theta_{X_i})$, there is associated a function $\Psi_{X_i}(R_{X_i}, \Theta_{X_i}) = \sin^{-1}[n \cdot (X_i \times R)/|X_i||R|]$ describing the azimuth angle dependence of ground topography on $R_{X_i}$ and $\Theta_{X_i}$, with some given accuracy; the unit vector n is chosen arbitrarily in the orthogonal complement to $X_i$, 105A.

Subsequently, vectors $Y_{i/k} = X_i + X_{i+1} + \ldots + X_{i+k}$; i=0, k, . . . , $k^{N-l-1}$ are defined. All the vectors $Y_j$ are noted to be of equal length and meander along a straight line within the given bound. SAR image polar coordinates $R_{Y_j}$, $\Theta_{Y_j}$ with respect to $Y_j$ by the same fixed convention as discussed above with reference to step 103 and the SAR image coordinate mesh with k times improved angular fineness given by the fixed fraction of $\lambda/|Y_j|$ is formed.

Subsequently, a coordinate transformation is performed, $R_{X_i}=R_{X_i}(R_{Y_{\lfloor i/k \rfloor}}, \Theta_{Y_{\lfloor i/k \rfloor}})$ and $\Theta_{X_i}=\Theta_{X_i}(R_{Y_{\lfloor i/k \rfloor}}, \Theta_{Y_{\lfloor i/k \rfloor}})$ (here $\lfloor \ \rfloor$ denotes rounding to nearest lower integer value). The k SAR images obtained according to step 103 and belonging to the vectors $X_i, X_{i+1}, \ldots, X_{i+k}$, as the k SAR images $f^{(i)}{}_{Y_{\lfloor i/k \rfloor}}(R_{Y_{\lfloor i/k \rfloor}}, \Theta_{Y_{\lfloor i/k \rfloor}})=f_{X_i}[R_{X_i}(R_{Y_{\lfloor i/k \rfloor}}, \Theta_{Y_{\lfloor i/k \rfloor}}), \Theta_{X_i}(R_{Y_{\lfloor i/k \rfloor}}, \Theta_{Y_{\lfloor i/k \rfloor}})]$ in the coordinate system and coordinate mesh of their sum vector $Y_{\lfloor i/k \rfloor}$ are represented, 108.

The k SAR images $f^{(i)}{}_{Y_{\lfloor i/k \rfloor}}(R_{Y_{\lfloor i/k \rfloor}}, \Theta_{Y_{\lfloor i/k \rfloor}})$ in each group are then added, whereupon $k^{N-l-1}$ SAR images $f_{Y_{\lfloor i/k \rfloor}}(R_{Y_{\lfloor i/k \rfloor}}, \Theta_{Y_{\lfloor i/k \rfloor}})$; $i=1, 2, \ldots, k^{N-l-1}$ are obtained with angular resolution k times improved to be of the order $\lambda/|Y_j|$.

As the coordinate transforms $R_{X_i}$ and $\Theta_{X_i}$ are obtained, the conditions referred to above with reference to steps 101A-103, are fulfilled for $k^{N-l-1}$ apertures $Y_j$ and the construction steps can be repeated to obtain $k^{N-l-2}$ apertures $Z_{i/k}=Y_i+Y_{i+1}+\ldots+Y_{i+k}$; $i=k, 2k, \ldots, k^{N-l-2}$ for iteration $l+2$.

Iteration of the construction from $l=1$ to $l=N$, gives only one SAR image with an aperture extending from the first SAR aperture position $P_1$ to the last SAR aperture position $P_{k^{N+1}}$ with a resolution determined by the length of the aperture $P_1 P_{k^{N+1}}$. This part of the procedure is general and is applicable both when the SAR or platform path is known and unknown.

Figure 6:
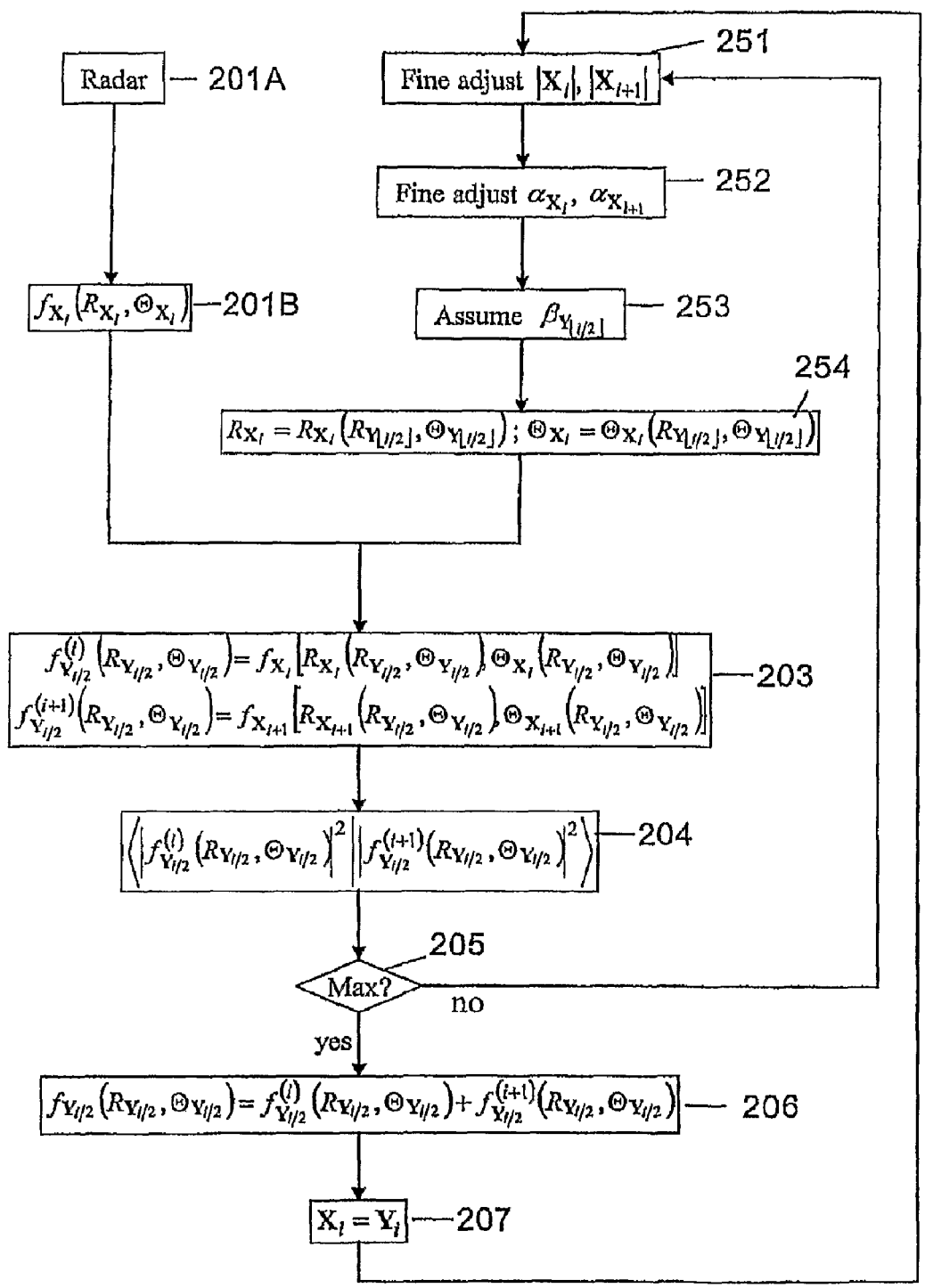
FIG. 6 is a detailed flow diagram in mathematical terms describing the autofocus procedure implemented when the path of the platform is unknown.

With reference to the flow diagram in FIG. 6 the procedure will now be considered when the SAR path is unknown. Therefore the iteration stage l in the iterative process of SAR image reconstruction is considered.

Reference is hereby made to step 104 which is modified.

It is assumed that there is a set of $2^{N-l}$ SAR images $f_{X_i}$ originating from linear apertures, forming a connected chain of vectors $X_i=P_iP_{i+1}$; $i=0, 1, \ldots, 2^{N-l}$, cf. 201A, 201B in FIG. 5. However here it is supposed that the localization of the points $P_j; P_{j+1}; P_{j+2}; \ldots$ is unknown or given with insufficient accuracy.

The SAR images are assumed to cover the same ground region $\Omega$ but the localization of $\Omega$ is known only approximately, though sufficiently for the ground topography to be known with the sufficient low accuracy. It is assumed that $\Omega$ is no larger than it can be assumed to be plane. This is no restriction since for an undulating ground, the current reconstruction chain will apply locally to any small, and thus approximately plane, region of the ground. The vectors $X_i$ are assumed to be of equal known length and meander along a straight line as discussed above. As also discussed above, the SAR images are assumed to be derived by the same algorithm expressing each SAR image as a function $f_{X_i}(R_{X_i}, \Theta_{X_i})$. Here $R_{X_i}=|R|$ where R is radius vector between any ground point in $\Omega$ and the midpoint $Q_i=P_i+X_i/2$ of $X_i$; $\Theta_{X_i}$ is the polar angle $\cos^{-1}(X_i \cdot R/|X_i||R|)$ with respect to the direction of $X_i$. Angular resolution is $\lambda/|X_i|$. Coordinate mesh angular fineness is assumed to be some fixed fraction of this value. Knowledge of the ground topography implies that to each SAR image $f_{X_i}(R_{X_i}, \Theta_{X_i})$, there is associated a known function $\Psi_{X_i}(R_{X_i}, \Theta_{X_i})=\sin^{-1}[n \cdot (X_i \times R)/|X_i||R|]$ describing the azimuth angle dependence of ground topography on $R_{X_i}$ and $\Theta_{X_i}$, with some given accuracy.

Now the construction steps for iteration $l+1$ will be described, (considering k=2) The vectors $Y_{i/2}=X_i+X_{i+1}$; $i=0, 2, \ldots, 2^{N-l-1}$ are defined and again the vectors are supposed to be of equal length and meander along a straight line within the given bound. As discussed above, with reference to step 106, the SAR image polar coordinates $R_{Y_i}, \Theta_{Y_i}$ are defined as discussed above and a SAR image coordinate mesh is formed with 2 times improved angular fineness given by the fixed fraction of $\lambda/|Y_i|$.

In the following will be described what is specific for the case with an unknown platform path.

Any 3-dimensional point given either in the coordinates $R_{X_i}, \Theta_{X_i}$ or $R_{X_{i+1}}, \Theta_{X_{i+1}}$ can, up to a certain tolerance and on the assumption of one single parameter, be re-represented by the coordinates $R_{Y_i}, \Theta_{Y_i}$ by a coordinate transform $R_{X_i}=R_{X_i}(R_{Y_{i/2}}, \Theta_{Y_{i/2}})$ and $\Theta_{X_i}=\Theta_{X_i}(R_{Y_{i/2}}, \Theta_{Y_{i/2}})$. In fact, even though the the orientation of $X_i, X_{i+1}$ unknown, the following observations can be made:

The lengths of the respective vectors $|X_i|$ are given with a certain accuracy and are supposed to be of equal length and and meander along a straight line within the given bounds. Second, since the orientation of the ground topography with respect to both $X_i$ and $X_{i+1}$ are given by the ground topography functions $\Psi_{X_i}(R_{X_i}, \Theta_{X_i})$ and $\Psi_{X_{i+1}}(R_{X_{i+1}}, \Theta_{X_{i+1}})$, according to the statement above relating to the image it is assumed to be derived by the same algorithm expressing each image as a function $f_{X_i}(R_{X_i}, \Theta_{X_i})$, the angles $\alpha_{X_i}$ and $\alpha_{X_{i+1}}$ of $X_i$ and $X_{i+1}$ with respect to the ground plane are known.

If however the ground is flat within the accuracy of $\Psi_{X_i}(R_{X_i}, \Theta_{X_i})$, this limitation on the knowledge of $\Psi_{X_i}(R_{X_i}, \Theta_{X_i})$ and $\Psi_{X_{i+1}}(R_{X_{i+1}}, \Theta_{X_{i+1}})$ leaves undetermined the angle $\beta_{Y_{i/2}}=\cos^{-1}(X_i \cdot X_{i+1}/|X_i||X_{i+1}|)$ between $X_i$ and $X_{i+1}$.

Given the lengths $|X_i|, |X_{i+1}|$, angle $\cos^{-1}(X_i \cdot X_{i+1}/|X_i||X_{i+1}|)$ and ground topography functions $\Psi_{X_i}(R_{X_i}, \Theta_{X_i})$ and $\Psi_{X_{i+1}}(R_{X_{i+1}}, \Theta_{X_{i+1}})$, the coordinate transforms $R_{X_i}=R_{X_i}(R_{Y_{i/k}}, \Theta_{Y_{i/k}})$ and $\Theta_{X_i}(R_{Y_{i/k}}, \Theta_{Y_{i/k}})$ are implied. If $\cos^{-1}(X_i \cdot X_{i+1}/|X_i||X_{i+1}|)$ is unknown the coordinate transforms will depend on the one unknown parameter $\beta_{Y_{i/2}}$.

For each selection of the parameter $\beta_{Y_{i/2}}$ each pair of SAR images $f_{X_i}(R_{X_i}, \Theta_{X_i})$ and $f_{X_{i+1}}(R_{X_{i+1}}, \Theta_{X_{i+1}})$ obtained as discussed above and belonging to $X_i$ and $X_{i+1}$ are represented as as the SAR image pair $f^{(i)}{}_{Y_{i/2}}(R_{Y_{i/2}}, \Theta_{Y_{i/2}})=f_{X_i}[R_{X_i}(R_{Y_{i/2}}, \Theta_{Y_{i/2}}), \Theta_{X_i}(R_{Y_{i/2}}, \Theta_{Y_{i/2}})]$, $f^{(i+1)}{}_{Y_{i/2}}(R_{Y_{i/2}}, \Theta_{Y_{i/2}})=f_{X_{i+1}}[R_{X_{i+1}}(R_{Y_{i/2}}, \Theta_{Y_{i/2}}), \Theta_{X_{i+1}}(R_{Y_{i/2}}, \Theta_{Y_{i/2}})]$ in the coordinate system and coordinate mesh of their sum vector $Y_{\lfloor i/2 \rfloor}$.

Then $\langle f^{(i)}{}_{Y_{i/2}}(R_{Y_{i/2}}, \Theta_{Y_{i/2}})|^2 \| f^{(i+1)}{}_{Y_{i/2}}(R_{Y_{i/2}}, \Theta_{Y_{i/2}})|^2 \rangle$ is computed in the new common coordinate system and $\beta_{Y_{i/2}}$ is varied in order to find its value providing correlation maximum, 203, 204.

The second and the third parameter may also be varied for each $\beta$, 253, 251 and 252 for fine adjustment purposes, the absolute values of the vectors $X_i, X_{i+1}$ corresponding to the lengths, and the angle $\alpha_{X_i}, \alpha_{X_{i+1}}$ being the angle the respective vector forms with ground. $\beta_{Y_{i/2}}$ is the angle between $\alpha_{X_i}$ and $\alpha_{X_{i+1}}$ and can be quite large, for example 2, 3 or 4 degrees (or more or less). It should be clear that these figures merely are given for examplifying reasons and to explain that this angle $\beta_{Y_{i/2}}$ is the most decisive factor. The correlation or maximizing procedure can be performed in many ways and therefore an example is only schematically illustrated in FIG. 6. Thus, when an estimate has been achieved for $\beta_{Y_{i/2}}$, the correlation $\langle f^{(i)}{}_{Y_{i/2}}(R_{Y_{i/2}}, \Theta_{Y_{i/2}})|^2 \| f^{(i+1)}{}_{Y_{i/2}}(R_{Y_{i/2}}, \Theta_{Y_{i/2}})|^2 \rangle$ is evaluated varying the second and third parameters as discussed above. Then $\beta_{Y_{i/2}}$ is slightly varied to find a maximum corresponding to any fine adjustement of $\beta_{Y_{i/2}}$.

Finally is in, 205, $f^{(i)}{}_{Y_{i/2}}(R_{Y_{i/2}}, \Theta_{Y_{i/2}})+f^{(i+1)}{}_{Y_{i/2}}(R_{Y_{i/2}}, \Theta_{Y_{i/2}})$ calculated for the pair of adjusted SAR images in the refined coordinate mesh $Y_{\lfloor i/2 \rfloor}$, whereupon $2^{N-1}$ SAR images $f_{Y_{i/2}}(R_{Y_{i/2}}, \Theta_{Y_{i/2}})$ are obtained with angular resolution 2 times improved to be of the order $\lambda/|Y_{\lfloor i/2 \rfloor}|$. Subsequently the iterations are repeated as for the case of a known aperture as discussed with reference to FIG. 5.

FIG. 6 thus illustrates the autofocus procedure according to the present invention which is enabled through the general approach discussed with reference to FIG. 5.

As discussed earlier in the application it is possible to perform the correlation also in other manners, and as discussed above a SAR image can be divided into smaller subimages and instead of varying $\alpha_{X_i}$, $\alpha_{X_{i+1}}$, $\beta_{Y_{i/2}}$ etc., the subimages are varied, distorted in an unlinear manner, and if they are divided in even smaller subimages, they can thus be moved in order to fit to one another and the correlation can be made locally in the (larger) higher level subimage so that it will be possible to see which type of distorsion that gives erroneous estimations of $\beta$, $\alpha$ etc. This means that there is no need for an optimization but $\beta$, $\alpha$ etc. can be calculated.

Thus, according to the present invention a particular formulation of FFB is provided which only relies on the intrinsic coordinates of a platform path which in turn enables autofocus in case the platform path is not known by application of the formulation of the FFB to shifting subaperture segments in order to find the path providing the optimal SAR image focus. The particular implementation of FFB is advantageous in that it provides a fully symmetric segmentation of FFB into a number of processing stages. It also reduces FFB to its basic dependence on the coordinates of the platform path. In contrast to known FFB methods, it makes plain the processing dependence on motion, topography and rounding off errors. Therefore the method as described in the present application is very useful for implementing fast codes for which a just sufficient computation accuracy is crucial in choosing processing hardware and architecture.

It is also extremely advantageous that radio waves which in spite of low frequency will provide a very good resolution by means of the invention.

It should be clear that the invention is not limited to the specific illustrated embodiments, but that it can be varied in a number of ways within the scope of the appended claims. The radar equipment may for example be mounted on any kind of platform and comprise one or more antennas, use radiowaves or microwaves etc. and any appropriate correlation or maximizing method can be used in case the platform path is not known.

The invention claimed is:

1. A radar system, comprising:
a platform movable along a platform path in relation to scenery, said scenery having a ground surface portion;
a positioning device;
a timing device; and
a radar equipment;
the positioning device, timing device and radar equipment being supported on the platform and implementing a diffraction limited synthetic aperture (SAR) technique for imaging the scenery,
the radar equipment configured for collecting and holding radar raw data, the radar raw data comprising radar echo amplitudes annotated with the distance and collection time of said radar echo amplitudes, and which collected radar raw data are intertwined with platform position measurement data which are annotated with the respective collection time of said position measurement data,
the radar equipment further configured for SAR processing using the collected radar raw data and position measurement data, wherein the radar equipment is adapted to calculate, by iteration, a sequence of summations of length k of radar amplitudes, annotated with distance and angular parameters, defined with respect to a common origin in 3-dimensional space, and wherein the common origin is defined at a location along a vector formed by the vector sum $P_0P_1+P_1P_2, \ldots, +P_{k-1}P_k$ of k connected 3-dimensional vectors $P_0P_1, P_1P_2, \ldots P_{k-1}P_k$ each containing a respective origin of each radar amplitude term in the summation, and each called a sub-aperture, and wherein the radar equipment is adapted to initiate the iteration process in a first iteration stage by regarding radar raw data as the radar amplitudes, where these radar data have their origins along vectors starting and ending in 3-dimensional points given by the positioning measurements carried out.

2. The radar system according to claim 1, wherein the radar equipment is adapted to iteratively merge radar amplitudes or SAR radar images pairwise, by choosing the value k equal to 2.

3. The radar system according to claim 1, wherein the radar equipment is adapted to iteratively merge radar amplitudes or SAR radar images in triples, k=3.

4. The radar system according to claim 1, wherein the radar equipment is adapted to iteratively merge radar amplitudes or SAR radar images in groups of four or more, $k \geq 4$.

5. The radar system according to claim 1, wherein the sub-apertures $P_0P_1, P_1P_2, \ldots, P_{k-1}P_k$ are approximately co-linear throughout all iteration stages, so the radar amplitudes will only approximately depend on distance and one angular parameter and in that the angular resolution improves with a factor k for each iteration, the radar equipment is adapted to chose the initial angular discretization mesh to be coarse and to be refined iteratively by a factor k for each iteration to create the resulting radar amplitude or SAR image.

6. The radar system according to claim 1, wherein the radar equipment is adapted to handle non-co-linearly disposed sub-apertures $P_0P_1, P_1P_2, \ldots, P_{k-1}P_k$, the scenery compressing a plane with an orientation and the radar equipment is providing information on said orientation to transcribe radar amplitudes depending on distance and angle with respect to some sub-aperture vector point to a new origin formed by the vector sum of several sub-aperture vectors.

7. The radar system according to claim 6, wherein the radar equipment is adapted to handle platform position measurements not known to a sufficient or given degree of accuracy, and being adapted to perform auto-focus processing actions based on matching obtained radar amplitudes, before their summation, by requiring the radar amplitudes to be as similar as possible, to find appropriate coordinate transcriptions between the sub-apertures $P_0P_1, P_1P_2, \ldots, P_{k-1}P_k$ each iteration stage.

8. The radar system according to claim 7, wherein the radar equipment, for each iteration, performs pairwise matching of radar amplitudes or SAR images, assuming k=2, by iteratively varying the relative orientation between two respective sub-apertures $P_0P_1$ and $P_1P_2$ to be added and their orientation to the scenery, wherein the ground plane until a correlation maximum is found and transcribing and to add the radar amplitudes or SAR images in the specific geometry thus found.

9. The radar system according to claim 8, wherein the radar equipment is adapted to perform a matching between radar amplitudes or SAR images comprising a correlation between intensities, or squared modulus, of the radar amplitudes.

10. The radar system according to claim 8, wherein the radar equipment is adapted to obtain a correlation maximum by dividing the radar amplitudes or SAR images in sub-images and by correlating sub-sub-images within a subimage to calculate at least one parameter comprising an angle $\beta$ between each respective two sub-apertures to be added.

11. The radar system according to claim 1, wherein it uses microwaves for the radar measurements.

12. The radar system according to claim 1, wherein it uses radio waves with a wavelength of about 3-15 m for the radar measurements.

13. A method for providing an image of a scenery having a ground surface portion, from a movable platform supporting a positioning device, a timing device and a radar equipment, using a diffraction limited synthetic aperture technique for imaging the scenery, said method comprising the steps of:
- collecting and holding radar raw data comprising radar echo amplitudes annotated with distance and collection time of said radar echo amplitudes;
- performing platform measurements annotated with respective collection time of measurement such that said collected radar raw data is intertwined with said platform measurements;
- calculating, by iteration, a sequence of summations of length of radar amplitudes defined with respect to a common origin in 3-dimensional space, said common origin being defined at a location along a vector formed by the vector sum $P_0P_1 + P_1P_2, \ldots, +P_{k-1}P_k$ of k connected 3-dimensional vectors, $P_0P_1, P_1P_2, \ldots, P_{k-1}P_k$, each containing a respective origin of each radar amplitude term in the summation, by initiating the iteration processing in a first iteration stage where radar raw data is regarded as the radar amplitudes, these radar raw data having their origins along vectors starting and ending in 3-dimensional points given by the performed position measurements.

14. The method according to claim 13, further comprising the step of iteratively merging radar amplitudes pairwise, k=2, or in groups of 3 or more, k≧3.

15. The method according to claim 3, further comprising the steps of, for substantially co-linear sub-apertures:
- initially choosing a coarse angular discretization mesh;
- iteratively obtaining a by the factor k refined angular discretization mesh, thus obtaining a resulting radar amplitude or SAR image.

16. The method according to claim 13, further comprising the step of, for non-co-linear sub-apertures using information on the orientation of a plane formed by the scenery to transcribe radar amplitudes depending on distance and angle with respect to some sub-aperture vector point to a new origin formed by the vector sum of several sub-aperture vectors.

17. The method according to claim 16, further comprising the steps of, when the accuracy of the platform position measurements does not reach a given level, or is not sufficient, performing autofocus actions based on matching obtained radar amplitudes before their summation, by requiring the radar amplitudes to be as similar as possible to find appropriate coordinate transcriptions between the sub-apertures in each iteration stage.

18. A method according to claim 17, further comprising the steps of, by the radar equipment, and in each iteration:
- pairwise matching radar amplitudes by assuming k=1 and by iteratively varying the relative orientation between the respective two sub-apertures and their orientation to the scenery until a correlation maximum is found corresponding to a specific geometry; and
- transcribing and adding the radar amplitudes in the specific geometry thus found.

19. The method according to claim 18, further comprising the step of matching between the radar amplitudes comprising a correlation between intensities, or squared modulus, of the radar amplitudes.

20. The method according to claim 18, further comprising the step of, for obtaining a correlation maximum, dividing radar amplitudes in sub-images; correlating sub-sub-images within a sub-image to calculating at least one parameter comprising an angle β between two respective sub-images to be added.

21. The method according to claim 13, further comprising the step of using microwaves or radio waves for the radar measurements.

* * * * *

UNITED STATES PATENT AND TRADEMARK OFFICE
CERTIFICATE OF CORRECTION

PATENT NO. : 7,884,752 B2
APPLICATION NO. : 12/517327
DATED : February 8, 2011
INVENTOR(S) : Hellsten et al.

It is certified that error appears in the above-identified patent and that said Letters Patent is hereby corrected as shown below:

In Column 6, Lines 19-20, delete "tranformation" and insert -- transformation --, therefor.

In Column 6, Line 24, delete "featuers" and insert -- features --, therefor.

In Column 7, Line 14, delete "$f_{P1} \rightarrow P_{i+1}$" and insert -- $f_{Pi} \rightarrow P_{i+1}$ --, therefor.

In Column 7, Line 53, delete " $\langle f(Q)^2 \rangle = \langle g(Q)^2 \rangle,$ " and insert -- $\langle f(Q)^2 \rangle = \langle g(Q)^2 \rangle,$ --, therefor.

In Column 7, Line 62, delete "concering" and insert -- concerning --, therefor.

In Column 8, Line 34, delete " $\langle f(Q)^2 \rangle = \langle g(Q)^2 \rangle,$ " and insert -- $\langle f(Q)^2 \rangle = \langle g(Q)^2 \rangle,$ --, therefor.

In Column 9, Line 7, delete "$f_B \rightarrow_C (R,\Theta))$" and insert -- $f_B \rightarrow_C (R,\Theta)$ --, therefor.

In Column 9, Line 12, delete "parallell" and insert -- parallel --, therefor.

In Column 9, Lines 16-17, delete "parallell," and insert -- parallel, --, therefor.

In Column 11, Line 63, delete "k=2)" and insert -- k=2): --, therefor.

In Column 12, Line 10, delete "though the the" and insert -- though the --, therefor.

In Column 12, Line 14, delete "length and" and insert -- length --, therefor.

Signed and Sealed this
Sixth Day of September, 2011

David J. Kappos
*Director of the United States Patent and Trademark Office*

CERTIFICATE OF CORRECTION (continued)
U.S. Pat. No. 7,884,752 B2

In Column 12, Line 30, delete "$\Theta_{X_i}(R_{Y_{i/k}}, \Theta_{Y_{i/k}})$" and insert -- $\Theta_{X_i} = \Theta_{X_i}(R_{Y_{i/k}}, \Theta_{Y_{i/k}})$ --, therefor.

In Column 12, Lines 37-38, delete "$f_{X_{i+1}}[R_{X_{i+1}}(R_{Y_{i/2}}), \Theta_{X_{i+1}}(R_{Y_{i/2}}, \Theta_{Y_{i/2}})]$" and insert -- $f_{X_{i+1}}[R_{X_{i+1}}(R_{Y_{i/2}}, \Theta_{Y_{i/2}}), \Theta_{X_{i+1}}(R_{Y_{i/2}}, \Theta_{Y_{i/2}})]$ --, therefor.

In Column 12, Line 40, delete "$\langle f^{(i)}{}_{Y_{i/2}}(R_{Y_{i/2}}, \Theta_{Y_{i/2}})|^2 \| f^{(i+1)}{}_{Y_{i/2}}(R_{Y_{i/2}}, \Theta_{Y_{i/2}})|^2 \rangle$" and insert -- $\langle |f^{(i)}{}_{Y_{i/2}}(R_{Y_{i/2}}, \Theta_{Y_{i/2}})|^2 \| f^{(i+1)}{}_{Y_{i/2}}(R_{Y_{i/2}}, \Theta_{Y_{i/2}})|^2 \rangle$ --, therefor.

In Column 12, Line 52, delete "examplifying" and insert -- exemplifying --, therefor.

In Column 12, Line 57, delete "$\langle f^{(i)}{}_{Y_{i/2}}(R_{Y_{i/2}}, \Theta_{Y_{i/2}})|^2 \| f^{(i+1)}{}_{Y_{i/2}}(R_{Y_{i/2}}, \Theta_{Y_{i/2}})|^2 \rangle$" and insert -- $\langle |f^{(i)}{}_{Y_{i/2}}(R_{Y_{i/2}}, \Theta_{Y_{i/2}})|^2 \| f^{(i+1)}{}_{Y_{i/2}}(R_{Y_{i/2}}, \Theta_{Y_{i/2}})|^2 \rangle$ --, therefor.

In Column 12, Line 60, delete "adjustement" and insert -- adjustment --, therefor.

In Column 13, Line 12, delete "distorsion" and insert -- distortion --, therefor.